US009061695B1

(12) United States Patent
Mann

(10) Patent No.: US 9,061,695 B1
(45) Date of Patent: Jun. 23, 2015

(54) MULTI PURPOSE BEACH CART

(71) Applicant: Cheryl M. Mann, Plymouth, MA (US)

(72) Inventor: Cheryl M. Mann, Plymouth, MA (US)

(*) Notice: Subject to any disclaimer, the term of this patent is extended or adjusted under 35 U.S.C. 154(b) by 0 days.

(21) Appl. No.: 14/310,466

(22) Filed: Jun. 20, 2014

(51) Int. Cl.
B62B 3/00 (2006.01)
B62B 3/02 (2006.01)
B62B 3/10 (2006.01)

(52) U.S. Cl.
CPC .... B62B 3/02 (2013.01); B62B 3/10 (2013.01)

(58) Field of Classification Search
CPC ............ B62B 3/02; B62B 3/10; B62B 3/007; B62B 3/12; B62B 7/062; B62B 2202/404; B62B 2205/20
USPC ........................................................ 280/651
See application file for complete search history.

(56) References Cited

U.S. PATENT DOCUMENTS

| 4,222,585 | A | * | 9/1980 | Crothers | 280/654 |
|---|---|---|---|---|---|
| 4,790,559 | A | * | 12/1988 | Edmonds | 280/655 |
| 4,865,346 | A | | 9/1989 | Carlile | |
| 5,362,079 | A | * | 11/1994 | Graham | 280/47.23 |
| 5,480,170 | A | | 1/1996 | Kaiser, II | |
| 5,876,047 | A | | 3/1999 | Dennis | |
| 5,915,722 | A | * | 6/1999 | Thrasher et al. | 280/649 |
| 5,988,671 | A | * | 11/1999 | Abelbeck et al. | 280/649 |
| 6,079,777 | A | * | 6/2000 | Simmons et al. | 297/217.1 |
| 6,203,053 | B1 | | 3/2001 | Sohrt et al. | 280/641 |
| 6,863,297 | B2 | * | 3/2005 | Shapiro | 280/646 |
| 7,543,840 | B2 | * | 6/2009 | Lin | 280/639 |
| 7,547,037 | B2 | * | 6/2009 | Poppinga et al. | 280/651 |
| 8,403,355 | B2 | * | 3/2013 | Liao | 280/651 |
| 8,511,406 | B2 | * | 8/2013 | Anasiewicz | 180/19.1 |
| 8,550,474 | B2 | * | 10/2013 | Geva et al. | 280/35 |
| 8,608,188 | B2 | * | 12/2013 | Goldszer | 280/651 |
| 8,944,443 | B2 | * | 2/2015 | Lin | 280/62 |
| 2003/0102654 | A1 | * | 6/2003 | Shapiro | 280/650 |
| 2006/0061066 | A1 | * | 3/2006 | Tan | 280/642 |
| 2007/0284855 | A1 | * | 12/2007 | Lin | 280/651 |
| 2008/0061524 | A1 | * | 3/2008 | Goldszer | 280/47.34 |
| 2008/0191451 | A1 | * | 8/2008 | Driessen | 280/650 |
| 2008/0217886 | A1 | * | 9/2008 | Poppinga et al. | 280/651 |
| 2008/0238012 | A1 | * | 10/2008 | Carter | 280/47.35 |
| 2009/0302564 | A1 | * | 12/2009 | Evans et al. | 280/47.38 |
| 2010/0078906 | A1 | * | 4/2010 | Pilgrim et al. | 280/47.22 |
| 2012/0104731 | A1 | * | 5/2012 | Goldszer | 280/651 |
| 2012/0112436 | A1 | * | 5/2012 | Liao | 280/651 |
| 2012/0160576 | A1 | * | 6/2012 | Anasiewicz | 180/19.1 |
| 2013/0113185 | A1 | * | 5/2013 | Zehfuss | 280/647 |
| 2013/0153616 | A1 | * | 6/2013 | Geva et al. | 224/401 |
| 2013/0229001 | A1 | * | 9/2013 | Liao | 280/651 |
| 2013/0300090 | A1 | * | 11/2013 | Wang | 280/651 |
| 2014/0125038 | A1 | * | 5/2014 | Lin | 280/651 |
| 2014/0239616 | A1 | * | 8/2014 | Donivan | 280/651 |

* cited by examiner

Primary Examiner — Hau Phan
Assistant Examiner — Jacob Meyer
(74) Attorney, Agent, or Firm — Crossley Patent Law

(57) ABSTRACT

A multi purpose beach cart configured to traverse a multitude of terrains having a first and second hinge plate pair configured to hinge each of a cart frame, a handle frame, a right wheel leg, and a left wheel leg, respectively such that beach cart is configured to fold together for transport. A front wheel leg and a front wheel is disposed upon an forward end of the cart frame. A chair holder frame is disposed upon each of two hinges attached to the cart frame. The beach cart also has a large beach bag having a rigid upper rim, an umbrella bag, a cooler bag, an insulated cooler, a chair holder frame, a tray disposed upon the handle frame, and at least one speaker configured to play music from a portable media player. The beach cart also includes a support base and load bearing first and second lateral members.

16 Claims, 3 Drawing Sheets

MULTI PURPOSE BEACH CART

BACKGROUND OF THE INVENTION

Getting to the beach with all of the essential and recreational gear often requires multiple trips. This can be made difficult in the summer months when parking is sparse and the distance between a parking spot and the beach can be well over a mile.

Various types of beach carts are known in the prior art, however these carts are often narrowly tailored to a specific need, such as a surfboard cart and can't accommodate a variety of different gear. Additionally the prior art carts are designed only with those in mind that already live at the beach. The prior art lacks the ability to easily fold up such that the cart can conveniently fit into an automobile for those that have to commute to and from the beach. Additionally, those prior art carts lack a speaker system for playing music from a portable media player and a wide variety of storage components for storing and transporting a variety of different types of items.

Thus, what is needed is multi purpose beach cart that can easily traverse a multitude of terrains, can fold up for convenient transport, and has a large beach bag, an umbrella bag, a cooler bag, an insulated cooler, a chair holder frame, a tray, and at least one speaker configured to play music from a portable media player.

FIELD OF THE INVENTION

The present invention relates to beach cart, and more particularly, to a multi purpose beach cart that can easily traverse a multitude of terrains and has a large beach bag, an umbrella bag, a cooler bag, an insulated cooler, a chair holder frame, a tray, and at least one speaker.

SUMMARY OF THE INVENTION

The general purpose of the present multi purpose beach cart, described subsequently in greater detail, is to provide a multi purpose beach cart which has many novel features that result in a multi purpose beach cart which is not anticipated, rendered obvious, suggested, or even implied by prior art, either alone or in combination thereof.

The multi purpose beach cart includes a cart frame having an arched forward end and a rearward end. The cart frame has a left longitudinal member and a right longitudinal member, each extending from the arched forward end of the cart frame to the rearward end of the cart frame. The distance between each of the longitudinal members is greater proximal the rearward end than is the distance between each of the longitudinal members proximal the forward end. Wherein the left and right longitudinal members extend away from each other as they extend away from the arched forward end towards the rearward end.

A first hinge plate pair is disposed upon the left longitudinal member with the left longitudinal member disposed between two hinge plates of the first hinge plate pair and secured therein. Each of the hinge plates of the first hinge plate pair are opposed mirror images having a distance between them sufficient to fit at least one of the longitudinal members therein. A second hinge plate pair is disposed upon the right longitudinal member in a similar fashion. Each of the hinge plates of the second hinge plate pair are also opposed mirror images having a distance between them sufficient to fit at least one of the longitudinal members therein. The hinge plates of each respective hinge plate pair are secured together such that the distance between each of the hinge plates of each respective hinge plate pair is approximately the same as the diameter of at least one of the longitudinal members secured therein. Hinge mechanisms other than the first and second hinge plate pair are envisioned that function in a similar manner and achieve an equivalent result of providing an attachment and hinge means.

The multi purpose beach cart also includes a handle frame having an upper end and a lower end. A handle grip is disposed upon the upper end of the handle frame. The upper end has a left arch and a right arch. The handle frame has a left vertical member extending from the left arch to the lower end. The handle frame has a right vertical member extending from the right arch to the lower end. The left vertical member is disposed within the first hinge plate pair, while the right vertical member disposed within the second hinge plate pair.

A front wheel leg is medially disposed upon the arched forward end. The front wheel leg has a single front wheel. The front wheel is configured to turn such that the directional movement of the multi purpose beach cart is determined by adjustment of the turn of the front wheel. A rubber stopper is disposed between the front wheel leg and the arched forward end. The stopper is configured to butress the front wheel leg. The stopper is also configured to support a pivot of the front wheel leg as the beach cart moves across uneven terrain. A left rear wheel leg is disposed within the first hinge plate pair. The left rear wheel leg has a single left rear wheel. A right rear wheel leg is disposed within the second hinge plate pair. The right rear wheel leg has a single right rear wheel.

The multi purpose beach cart also includes a first hinge and a second hinge. The first hinge is disposed upon the left longitudinal member. The second hinge is disposed upon the right longitudinal member. A chair holder frame having a left attachment and a right attachment is included. The left attachment is disposed upon the first hinge, while the right attachment is disposed upon the second hinge. Each of the first and second hinge are configured to reversibly lock the chair holder frame in a position approximately 45 degrees respective the forward end of the cart frame.

A load bearing first lateral member is affixed across the longitudinal members as is best seen in FIG. 5. The first lateral member is configured to distribute a weight upon the cart frame. A load bearing support base is disposed upon the cart frame proximal the arched forward end. The support base is configured to support and distribute a weight upon the cart frame. The support base has at least one of a sand evacuator aperture disposed upon the support base. The sand evacuator aperture is large enough to allow a volume of sand to be swept therethrough. A load bearing second lateral member is affixed across the left vertical member and the right vertical member. The second lateral member is configured to support and distribute a weight upon the handle frame.

The multi purpose beach cart also includes at least one speaker. Each of the at least one speaker is in operational communication with a power source. Additionally, each of the at least one speaker is configured to engage and operationally communicate with a portable media player (not illustrated) such that an audio signal transmitted from the portable media player to the at least one speaker broadcasts through each of the at least one speaker. It is envisioned that the power source is rechargeable such as that of a rechargeable lithium-ion battery. It is also envisioned that the portable media player may serve as an alternative to the power source, such that the portable media player is used to power the at least one speaker.

A load bearing tray is disposed upon the upper end of the handle frame. The tray is configured to support a weight upon the tray. An umbrella bag made of a durable fabric material is fastened upon the handle frame. The umbrella bag is configured to hold a variety of differently shaped umbrellas therein. The umbrella bag is fastened upon the handle frame via a plurality of hook and loop fasteners, however it is envisioned that other fastening means may be used, such as button fasteners.

A beach bag formed of a durable fabric material is removably disposed upon the cart frame. The beach bag has a rigid upper rim configured to support an opening of the beach bag. The beach bag is supported by the each of the support base, the chair holder frame, and the second lateral member. The beach bag is fastened upon the handle frame via at least one of the plurality of hook and loop fasteners, however other fastener mechanisms are envisioned, such as button fasteners.

A cooler bag formed of a durable fabric is disposed on an undercarriage of the cart frame. The cooler bag is removably fastened to the cart frame and is configured to support an insulated cooler therein. The insulated cooler is removably disposed within the cooler bag. The insulated cooler has a cooler handle for convenient transport of the insulated cooler.

Each of the left and right longitudinal members have a vertical bend proximal the rearward end. The vertical bend is of an angle approximately 125 degrees respective the forward end of the cart frame, such that the lower end of the handle frame is approximately 125 degrees respective the forward end of the cart frame. The handle frame has a second bend proximal the upper end, wherein the upper end is angled substantially parallel with the forward end of the cart frame. Each of the vertical bend and the second bend render the combined shape of the handle frame and the cart frame in a substantially extended-Z shape, with the upper part of the Z being smaller in length than the lower part of the Z.

Additional features of the multi purpose beach cart include that each of the first hinge plate pair and the second hinge plate pair are configured to hinge each of the cart frame, the handle frame, the right wheel leg, and the left wheel leg, respectively. The beach cart is also adapted for use over uneven terrain, wherein each of the front wheel, left rear wheel, and the right rear wheel have a width of at least three inches, rendering it ideal for use over sandy terrains. The undercarriage of the cart frame is greater than 6 inches above the ground. It is envisioned that each of the cart frame, the handle frame, the left rear wheel leg, the right rear wheel leg, and the front wheel leg are composed of a durable lightweight metal and alternately composed of a durable lightweight plastic.

Thus has been broadly outlined the more important features of the present multi purpose beach cart so that the detailed description thereof that follows may be better understood and in order that the present contribution to the art may be better appreciated.

Numerous objects, features and advantages of the present multi purpose beach cart will be readily apparent to those of ordinary skill in the art upon reading the following detailed description of presently preferred, but nonetheless illustrative, examples of the present multi purpose beach cart when taken in conjunction with the accompanying drawings.

BRIEF DESCRIPTION OF THE DRAWINGS

FIGURES

Figure 1:
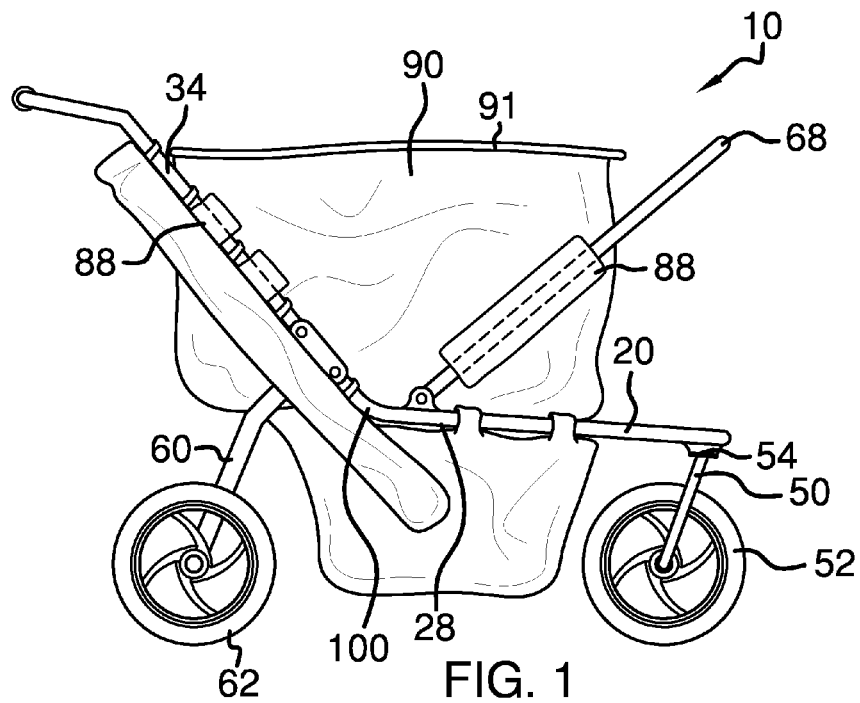

FIG. 1 is a side view view.

Figure 2:
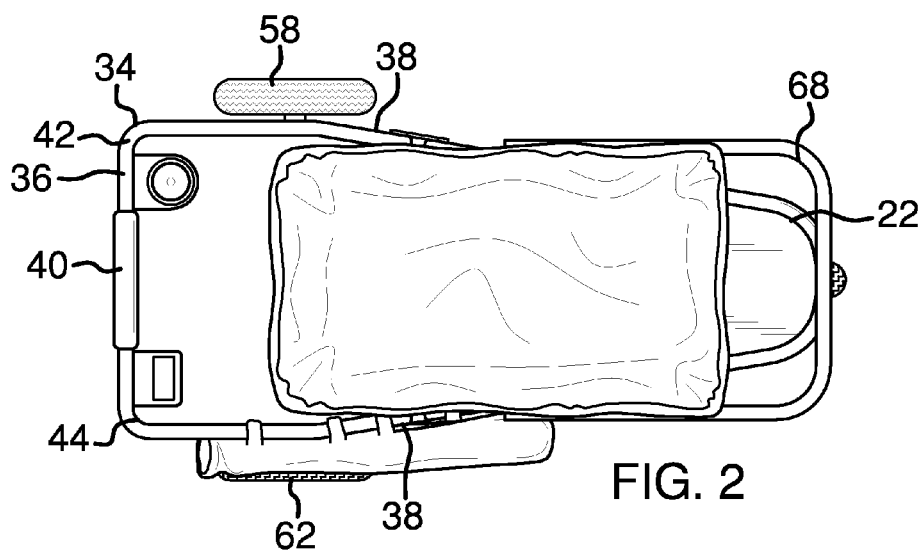

FIG. 2 is a top view view.

Figure 3:
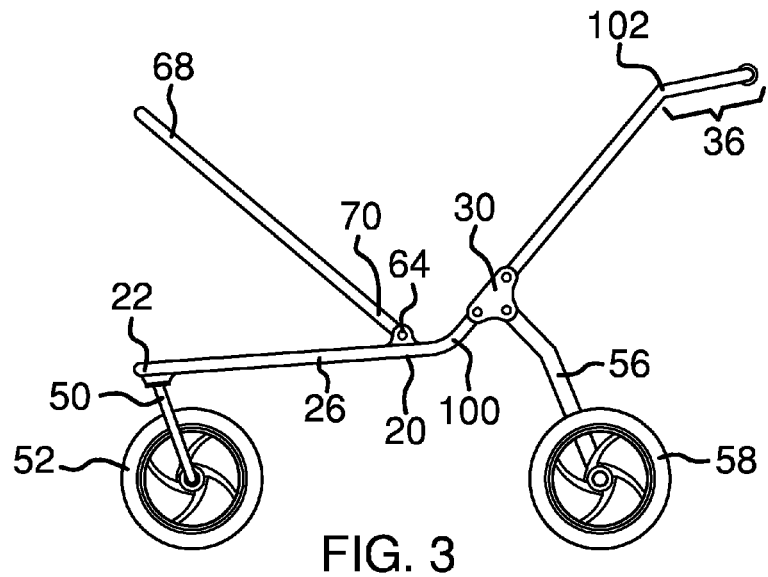

FIG. 3 is a detail view of the handle frame, the cart frame, the chair holder frame, and the components thereof.

Figure 4:
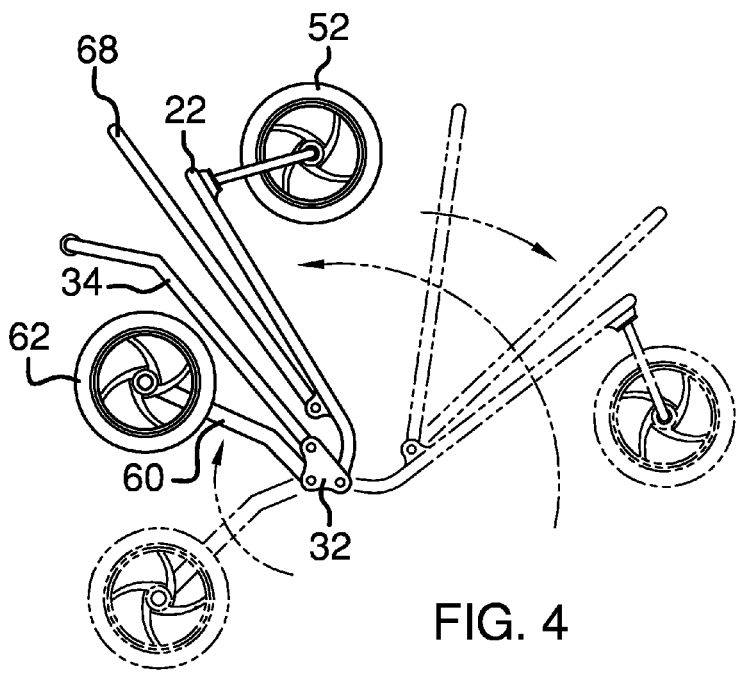

FIG. 4 is a folding detail view of the handle frame, the cart frame, the chair holder frame, and the components thereof.

Figure 5:
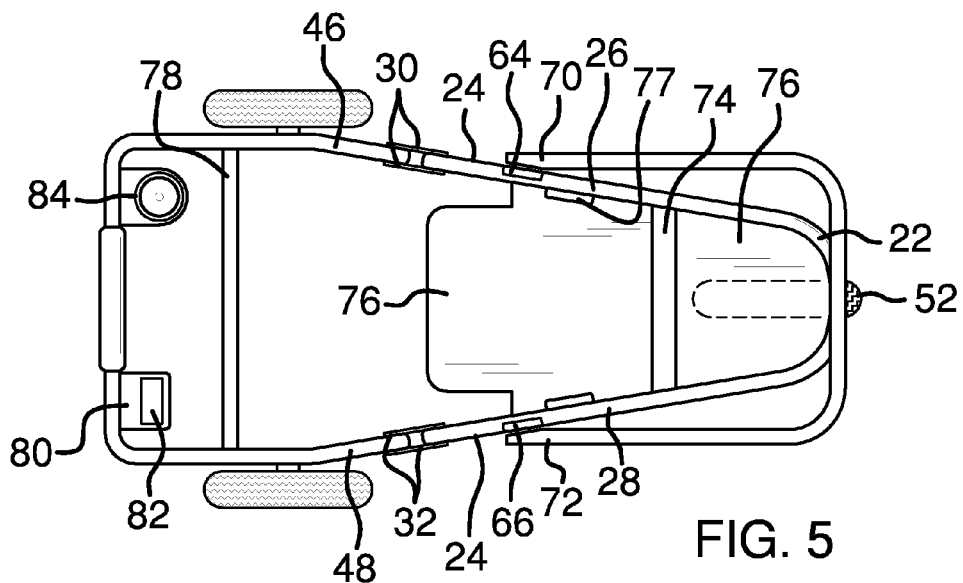

FIG. 5 is a top view of the view of the handle frame, the cart frame, the chair holder frame, and the components thereof.

Figure 6:
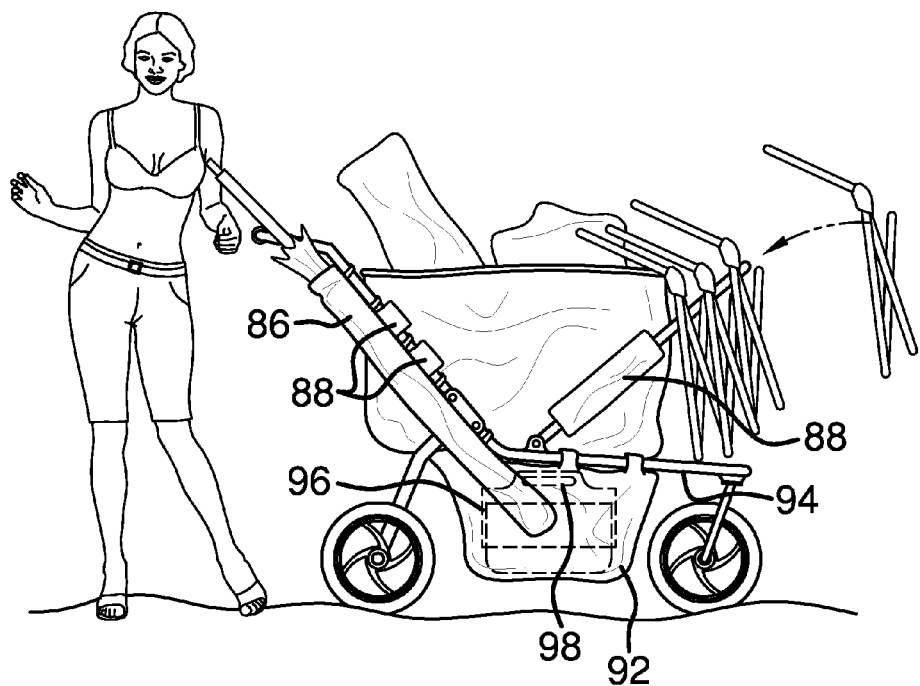

FIG. 6 is an in-use view.

DETAILED DESCRIPTION OF THE DRAWINGS

With reference now to the drawings, and in particular FIGS. 1 through 6 thereof, the instant multi purpose beach cart employing the principles and concepts of the present multi purpose beach cart and generally designated by the reference number 10 will be described.

Referring to FIGS. 1 through 6 a preferred embodiment of the present multi purpose beach cart 10 is illustrated. The multi purpose beach cart 10 includes a cart frame 20 having an arched forward end 22 and a rearward end 24. The cart frame 20 has a left longitudinal member 26 and a right longitudinal member 28, each extending from the arched forward end 22 of the cart frame 20 to the rearward end 24 of the cart frame 20. The distance between each of the longitudinal members 26, 28 is greater proximal the rearward end 24 than is the distance between each of the longitudinal members 26, 28 proximal the forward end 22. Wherein the left and right longitudinal members 26, 28 extend away from each other as they extend away from the arched forward end 22 towards the rearward end 24.

A first hinge plate pair 30 is disposed upon the left longitudinal member 26 with the left longitudinal member 26 disposed between two hinge plates of the first hinge plate pair 30 and secured therein. Each of the hinge plates of the first hinge plate pair 30 are opposed mirror images having a distance between them sufficient to fit at least one of the longitudinal members 26, 28 therein. A second hinge plate pair 32 is disposed upon the right longitudinal member 28 in a similar fashion. Each of the hinge plates of the second hinge plate pair 32 are also opposed mirror images having a distance between them sufficient to fit at least one of the longitudinal members 26, 28 therein. The hinge plates of each respective hinge plate pair 30, 32 are secured together such that the distance between each of the hinge plates of each respective hinge plate pair 30, 32 is approximately the same as the diameter of at least one of the longitudinal members 26, 28 secured therein. Hinge mechanisms other than the first and second hinge plate pair 30, 32 are envisioned that function in a similar manner and achieve an equivalent result of providing an attachment and hinge means.

The multi purpose beach cart 10 also includes a handle frame 34 having an upper end 36 and a lower end 38. A handle grip 40 is disposed upon the upper end 36 of the handle frame 34. The upper end 36 has a left arch 42 and a right arch 44. The handle frame 34 has a left vertical member 46 extending from the left arch 42 to the lower end 38. The handle frame 34 has a right vertical member 48 extending from the right arch 44 to the lower end 38. The left vertical member 46 is disposed within the first hinge plate pair 30, while the right vertical member 48 disposed within the second hinge plate pair 32.

A front wheel leg 50 is medially disposed upon the arched forward end 22. The front wheel leg 50 has a single front wheel 52. The front wheel 52 is configured to turn such that the directional movement of the multi purpose beach cart is determined by adjustment of the turn of the front wheel 52. A rubber stopper 54 is disposed between the front wheel leg 50 and the arched forward end 22. The stopper 54 is configured to butress the front wheel leg 50. The stopper 54 is also configured to support a pivot of the front wheel leg 50 as the beach cart 10 moves across uneven terrain. A left rear wheel leg 56 is disposed within the first hinge plate pair 30. The left rear wheel leg 56 has a single left rear wheel 58. A right rear wheel leg 60 is disposed within the second hinge plate pair 32. The right rear wheel leg 60 has a single right rear wheel 62.

The multi purpose beach cart 10 also includes a first hinge 64 and a second hinge 66. The first hinge 64 is disposed upon the left longitudinal member 26. The second hinge 66 is disposed upon the right longitudinal member 28. A chair holder frame 68 having a left attachment 70 and a right attachment 72 is included. The left attachment 70 is disposed upon the first hinge 64, while the right attachment 72 is disposed upon the second hinge 66. Each of the first and second hinge 64, 66 are configured to reversibly lock the chair holder frame 68 in a position approximately 45 degrees respective the forward end 22 of the cart frame 20.

A load bearing first lateral member 74 is affixed across the longitudinal members 26, 28 as is best seen in FIG. 5. The first lateral member 74 is configured to distribute a weight upon the cart frame 20. A load bearing support base 76 is disposed upon the cart frame 20 proximal the arched forward end 22. The support base 76 is configured to support and distribute a weight upon the cart frame 20. The support base 76 has at least one of a sand evacuator aperture 77 disposed upon the support base 76. The sand evacuator aperture is large enough to allow a volume of sand to be swept therethrough. A load bearing second lateral member 78 is affixed across the left vertical member 46 and the right vertical member 48. The second lateral member 78 is configured to support and distribute a weight upon the handle frame 34.

The multi purpose beach cart 10 also includes at least one speaker 80. Each of the at least one speaker 80 is in operational communication with a power source 82. Additionally, each of the at least one speaker 80 is configured to engage and operationally communicate with a portable media player (not illustrated) such that an audio signal transmitted from the portable media player to the at least one speaker 80 broadcasts through each of the at least one speaker 80. It is envisioned that the power source 82 is rechargeable such as that of a rechargeable lithium-ion battery. It is also envisioned that the portable media player may serve as an alternative to the power source 82, such that the portable media player is used to power the at least one speaker 80.

A load bearing tray 84 is disposed upon the upper end 36 of the handle frame 34. The tray 84 is configured to support a weight upon the tray 84. An umbrella bag 86 made of a durable fabric material is fastened upon the handle frame 34. The umbrella bag 86 is configured to hold a variety of differently shaped umbrellas therein. The umbrella bag 86 is fastened upon the handle frame via a plurality of hook and loop fasteners 88, however it is envisioned that other fastening means may be used, such as button fasteners.

A beach bag 90 formed of a durable fabric material is removably disposed upon the cart frame 20. The beach bag 90 has a rigid upper rim 91 configured to support an opening of the beach bag 94. The beach bag 90 is supported by the each of the support base 76, the chair holder frame 68, and the second lateral member 78. The beach bag 90 is fastened upon the handle frame 34 via at least one of the plurality of hook and loop fasteners 88, however other fastener mechanisms are envisioned, such as button fasteners.

A cooler bag 92 formed of a durable fabric is disposed on an undercarriage 94 of the cart frame 20. The cooler bag 92 is removably fastened to the cart frame 20 and is configured to support an insulated cooler 96 therein. The insulated cooler 96 is removably disposed within the cooler bag 92. The insulated cooler 96 has a cooler handle 98 for convenient transport of the insulated cooler 96.

Each of the left and right longitudinal members 26, 28 have a vertical bend 100 proximal the rearward end 24. The vertical bend 100 is of an angle approximately 125 degrees respective the forward end 22 of the cart frame 20, such that the lower end 38 of the handle frame 34 is approximately 125 degrees respective the forward end 22 of the cart frame 20. The handle frame 34 has a second bend 102 proximal the upper end 36, wherein the upper end 36 is angled substantially parallel with the forward end 22 of the cart frame 20. Each of the vertical bend 100 and the second bend 102 render the combined shape of the handle frame 34 and the cart frame 20 in a substantially extended-Z shape, with the upper part of the Z being smaller in length than the lower part of the Z.

Additional features of the multi purpose beach cart 10 include that each of the first hinge plate pair 30 and the second hinge plate pair 32 are configured to hinge each of the cart frame 20, the handle frame 34, the right wheel leg 60, and the left wheel leg 56, respectively. The beach cart 10 is also adapted for use over uneven terrain, wherein each of the front wheel 52, left rear wheel 58, and the right rear wheel 62 have a width of at least three inches, rendering it ideal for use over sandy terrains. The undercarriage 94 of the cart frame 20 is greater than 6 inches above the ground. It is envisioned that each of the cart frame 20, the handle frame 34, the left rear wheel leg 56, the right rear wheel leg 60, and the front wheel leg 50 are composed of a durable lightweight metal and alternately composed of a durable lightweight plastic.

What is claimed is:

1. A multi purpose beach cart comprising:
   a cart frame having an arched forward end and a rearward end, the cart frame including a left and right longitudinal member extending from the arched forward end of the cart frame to the rearward end of the cart frame;
   a first hinge plate pair disposed upon the left longitudinal member;
   a second hinge plate pair disposed upon the right longitudinal member;
   a handle frame having an upper end and a lower end, the upper end having a left arch and a right arch, the handle frame having a left vertical member extending from the left arch to the lower end, the handle frame having a right vertical member extending from the right arch to the lower end, the left vertical member disposed upon the first hinge plate pair, the right vertical member disposed upon the second hinge plate pair;
   a handle grip disposed upon the upper end of the handle frame;
   a front wheel leg medially disposed upon the arched forward end, the front wheel leg having a single front wheel;
   a left rear wheel leg disposed upon the first hinge plate pair, the left rear wheel leg having a single left rear wheel; and
   a right rear wheel leg disposed upon the second hinge plate pair, the right rear wheel leg having a single right rear wheel;
   wherein each of the first hinge plate pair and the second hinge plate pair are configured to hinge each of the cart frame, the handle frame, the right wheel leg, and the left wheel leg, respectively; further comprising: a first and second hinge, the first hinge disposed upon the left longitudinal member, the second hinge disposed upon the right longitudinal member; and a chair holder frame having a left attachment and a right attachment, the left attachment disposed upon the first hinge, the right attachment disposed upon the second hinge; wherein each of the first and second hinge are configured to lock the chair holder frame in a position approximately 45 degrees respective the forward end of the cart frame.

2. The multi purpose beach cart of claim 1 further comprising:
a load bearing first lateral member affixed across said longitudinal members, the first lateral member configured to distribute a weight upon the cart frame; and
a load bearing support base disposed upon the cart frame, the support base configured to support and distribute a weight upon the cart frame.

3. The multi purpose beach cart of claim 2 further comprising:
a load bearing second lateral member affixed across the left vertical member and the right vertical member, the second lateral member configured to support and distribute a weight upon the handle frame.

4. The multi purpose beach cart of claim 3 further comprising:
at least one speaker, each of the at least one speaker in operational communication with a power source, each of the at least one speaker configured to engage and operationally communicate with a portable media player such that an audio signal transmitted from the portable media player to the at least one speaker broadcasts through the at least one speaker.

5. The multi purpose beach cart of claim 4 further comprising:
a load bearing tray disposed upon the upper end of the handle frame, the tray configured to support a weight.

6. The multi purpose beach cart of claim 5 further comprising:
an umbrella bag made of a durable fabric material removably fastened upon the handle frame, the umbrella bag configured to hold a variety of differently shaped umbrellas therein.

7. The multi purpose beach cart of claim 6 wherein the umbrella bag is fastened upon the handle frame via a plurality of hook and loop fasteners.

8. The multi purpose beach cart of claim 6 further comprising:
a beach bag formed of a durable fabric material removably disposed upon the cart frame, the beach bag having a rigid upper rim configured to support an opening of the beach bag, wherein the beach bag is supported by the each of the support base, the chair holder frame, and the second lateral member, wherein the beach bag is removably fastened to each of the chair holder frame and the handle frame.

9. The multi purpose beach cart of claim 8 wherein the beach bag is fastened upon each of the handle frame and the chair holder frame, respectively via a plurality of hook and loop fasteners.

10. The multi purpose beach cart of claim 8 further comprising:
a cooler bag formed of a durable fabric disposed on an undercarriage of the cart frame, the cooler bag removably fastened to the cart frame, the cooler bag configured to support a cooler therein, the cooler removably disposed within the cooler bag, the cooler having a cooler handle.

11. The multi purpose beach cart of claim 10 wherein each of the left and right longitudinal member have a vertical bend proximal the rearward end of approximately 125 degrees respective the cart frame, such that the lower end of the handle frame is approximately 125 degrees respective the forward end of the cart frame.

12. The multi purpose beach cart of claim 11 wherein the handle frame has a second bend proximal the upper end, wherein the upper end is of an angle, wherein the upper end is at an angle substantially parallel with the frontward end of the cart frame.

13. The multi purpose beach cart of claim 12 further comprising a rubber stopper disposed in between the front wheel leg and the arched forward end, the stopper configured to butress the front wheel leg.

14. The multi purpose beach cart of claim 13 wherein the beach cart is adapted for use over uneven terrain, wherein each of the front wheel, left rear wheel, and the right rear wheel have a width of at least three inches; and
wherein each of the front wheel leg, left rear wheel leg, and right rear wheel leg have a height of no less than approximately 6 inches.

15. The multi purpose beach cart of claim 14 wherein each of the cart frame, the handle frame, the left rear wheel leg, the right rear wheel leg, and the front wheel leg are composed of a durable lightweight metal and alternately composed of a durable lightweight plastic.

16. A multi purpose beach cart comprising:
a cart frame having an arched forward end and a rearward end, the cart frame including a left and right longitudinal member extending from the arched forward end to the rearward end of the cart frame, the distance between each of the longitudinal members greater proximal the rearward end than the distance between each of the longitudinal members proximal the forward end;
a first hinge plate pair disposed upon the left longitudinal member, each of the hinge plates of the first hinge plate pair being opposed mirror images having a distance between them sufficient to fit at least one of the longitudinal members therein;
a second hinge plate pair disposed upon the right longitudinal member, each of the hinge plates of the second hinge plate pair being opposed mirror images having a distance between them sufficient to fit at least one of the longitudinal members therein;
a handle frame having an upper end and a lower end, the upper end having a left arch and a right arch, the handle frame having a left vertical member extending from the left arch to the lower end, the handle frame having a right vertical member extending from the right arch to the lower end, the left vertical member disposed upon the first hinge plate pair, the right vertical member disposed upon the second hinge plate pair;
a handle grip disposed upon the upper end of the handle frame;
a front wheel leg medially disposed upon the arched forward end, the front wheel leg having a single front wheel;
a left rear wheel leg disposed upon the first hinge plate pair, the left rear wheel leg having a single left rear wheel;
a right rear wheel leg disposed upon the second hinge plate pair, the right rear wheel leg having a single right rear wheel;
a first and second hinge, the first hinge disposed upon the left longitudinal member, the second hinge disposed upon the right longitudinal member;
a chair holder frame having a left attachment and a right attachment, the left attachment disposed upon the first hinge, the right attachment disposed upon the second hinge;
a load bearing first lateral member affixed across said longitudinal members, the first lateral member configured to distribute a weight upon the cart frame;

a load bearing support base disposed upon the cart frame, the support base configured to support and distribute a weight upon the cart frame;

a load bearing second lateral member affixed across the left vertical member and the right vertical member, the second lateral member configured to support and distribute a weight upon the handle frame;

at least one speaker, each of the at least one speaker in operational communication with a power source, each of the at least one speaker configured to engage and operationally communicate with a portable media player such that an audio signal transmitted from the portable media player to the at least one speaker broadcasts through the at least one speaker;

a load bearing tray disposed upon the upper end of the handle frame, the tray configured to support a weight;

an umbrella bag made of a durable fabric material fastened upon the handle frame, the umbrella bag configured to hold a variety of differently shaped umbrellas therein, the umbrella bag fastened upon the handle frame via at least one of a plurality of hook and loop fasteners;

a beach bag formed of a durable fabric material removably disposed upon the cart frame, the beach bag having a rigid upper rim configured to support an opening of the beach bag, wherein the beach bag is supported by the each of the support base, the chair holder frame, and the second lateral member, wherein the beach bag is removably fastened to each of the chair holder frame and the handle frame via at least one of the plurality of hook and loop fasteners, respectively;

a cooler bag formed of a durable fabric disposed on an undercarriage of the cart frame, the cooler bag removably fastened to the cart frame, the cooler bag configured to support a cooler therein, the cooler removably disposed within the cooler bag, the cooler having a cooler handle; and a rubber stopper disposed between the front wheel leg and the arched forward end, the stopper configured to butress the front wheel leg;

wherein the handle frame has a second bend proximal the upper end, wherein the upper end angled substantially parallel with the frontward end of the cart frame;

wherein each of the left and right longitudinal member have a vertical bend proximal the rearward end of approximately 125 degrees respective the cart frame, such that the lower end of the handle frame is approximately 125 degrees respective the forward end of the cart frame;

wherein each of the first and second hinge are configured to lock the chair holder frame in a position approximately 45 degrees respective the cart frame;

wherein each of the first hinge plate pair and the second hinge plate pair are configured to hinge each of the cart frame, the handle frame, the right wheel leg, and the left wheel leg, respectively, the beach cart configured to fold together about each of the first and second hinge plate pairs;

wherein the beach cart is adapted for use over uneven terrain, wherein each of the front wheel, left rear wheel, and the right rear wheel have a width of at least three inches;

wherein each of the front wheel leg, left rear wheel leg, and right rear wheel leg have a height of no less than approximately 6 inches; and wherein each of the cart frame, the handle frame, the left rear wheel leg, the right rear wheel leg, and the front wheel leg are composed of a durable lightweight metal and alternately composed of a durable lightweight plastic.

\* \* \* \* \*